(12) United States Patent
Fielitz et al.

(10) Patent No.: US 11,247,322 B2
(45) Date of Patent: Feb. 15, 2022

(54) TOOL DEVICE—WITH MODULE ATTACHMENTS

(71) Applicant: HILTI AKTIENGESELLSCHAFT, Schaan (LI)

(72) Inventors: Harald Fielitz, Lindau (DE); Karl Franz, Oppenweiler (DE); Matthias Blessing, Frastanz (AT)

(73) Assignee: Hilti Aktiengesellschaft, Schaan (LI)

( * ) Notice: Subject to any disclaimer, the term of this patent is extended or adjusted under 35 U.S.C. 154(b) by 151 days.

(21) Appl. No.: 16/471,917

(22) PCT Filed: Dec. 12, 2017

(86) PCT No.: PCT/EP2017/082407
§ 371 (c)(1),
(2) Date: Jun. 20, 2019

(87) PCT Pub. No.: WO2018/114481
PCT Pub. Date: Jun. 28, 2018

(65) Prior Publication Data
US 2019/0329394 A1 Oct. 31, 2019

(30) Foreign Application Priority Data
Dec. 23, 2016 (EP) ...................................... 16206612

(51) Int. Cl.
*B25F 3/00* (2006.01)
*B23B 45/00* (2006.01)

(52) U.S. Cl.
CPC .............. *B25F 3/00* (2013.01); *B23B 45/003* (2013.01)

(58) Field of Classification Search
CPC .............. B25F 3/00; B25F 5/02; B23B 45/003
(Continued)

(56) References Cited

U.S. PATENT DOCUMENTS 2,808,085 A * 10/1957 Hollien ................... B27C 9/005
 408/234
3,600,735 A * 8/1971 Jerabek ................. A47L 11/164
 15/49.1
(Continued)

FOREIGN PATENT DOCUMENTS

CN 100462171 C 2/2009
CN 203 566 643 U 4/2014
(Continued)

OTHER PUBLICATIONS

International Bureau, International Search Report in International Application No. PCT/EP2017/082407, dated Mar. 28, 2018.

*Primary Examiner* — Gloria R Weeks
(74) *Attorney, Agent, or Firm* — Leydig Voit & Mayer, Ltd.

(57) ABSTRACT

A tool device comprises a first module and a second module that can be detached from the first module, the first module having a receptacle and the second module having an insertion part that can be inserted in the receptacle along an insertion axis. The insertion part can be rotated in the receptacle about the insertion axis between a locked position and an enabled position, the receptacle having a first projection and the insertion part having a second projection. In the locked position, the second projection engages behind the first projection in the direction of the insertion axis, and in the enabled position, the first projection enables the second projection to pass in the direction of the insertion axis, the receptacle preventing an activation of the tool device in an initial position and allowing activation of the tool device in a pressed-on position.

16 Claims, 11 Drawing Sheets

(58) Field of Classification Search
USPC .......................................................... 173/29
See application file for complete search history.

(56) References Cited

U.S. PATENT DOCUMENTS

| | | | | |
|---|---|---|---|---|
| 3,724,237 | A * | 4/1973 | Wood .................. | B25F 3/00 464/177 |
| 4,103,511 | A * | 8/1978 | Kress .................. | B25F 3/00 29/560 |
| 4,125,339 | A * | 11/1978 | Pittinger, Sr ........ | A01D 34/416 403/348 |
| 6,039,126 | A * | 3/2000 | Hsieh ................. | B25B 21/00 173/170 |
| 6,286,611 | B1 * | 9/2001 | Bone .................. | B25F 3/00 173/170 |
| 6,672,402 | B2 * | 1/2004 | Ortt ................... | B25F 5/02 173/1 |
| 6,886,643 | B2 * | 5/2005 | Riley .................. | B24B 23/022 173/171 |
| 7,331,738 | B2 | 2/2008 | Hofbrucker et al. | |
| 8,157,148 | B2 * | 4/2012 | Scirica ............... | A61B 17/07207 227/175.1 |
| 8,672,049 | B2 | 3/2014 | Tokairin et al. | |
| 8,695,725 | B2 * | 4/2014 | Lau .................... | B25F 5/02 173/170 |
| 8,794,348 | B2 * | 8/2014 | Rudolph .............. | B25B 21/00 173/48 |
| 8,852,057 | B2 * | 10/2014 | Matsumoto ......... | A01D 34/90 477/181 |
| 9,545,699 | B2 * | 1/2017 | Furusawa ........... | B27B 19/006 |
| 2005/0279517 | A1 | 12/2005 | Hoffman et al. | |
| 2007/0007024 | A1 | 1/2007 | Tokairin et al. | |
| 2010/0071923 | A1 * | 3/2010 | Rudolph .............. | B25B 21/00 173/48 |
| 2011/0011609 | A1 * | 1/2011 | Simm ................. | B25D 17/04 173/171 |
| 2013/0008677 | A1 * | 1/2013 | Huifu ................. | B25D 1/00 173/29 |
| 2013/0264085 | A1 * | 10/2013 | Ciotti ................. | B25B 27/10 173/29 |
| 2015/0115554 | A1 | 4/2015 | Tussing | |
| 2015/0136828 | A1 | 5/2015 | Li | |
| 2015/0343583 | A1 * | 12/2015 | McRoberts .......... | B25F 5/02 173/213 |
| 2016/0052118 | A1 * | 2/2016 | Rudolph .............. | B25B 21/026 173/48 |
| 2018/0029214 | A1 | 2/2018 | Brennenstuhl et al. | |
| 2019/0329395 | A1 | 10/2019 | Fielitz et al. | |

FOREIGN PATENT DOCUMENTS

| | | |
|---|---|---|
| DE | 10 2013 213 804 A1 | 5/2014 |
| DE | 102015200828 A1 | 7/2016 |
| DE | 10 2016 202 831 A1 | 8/2016 |
| JP | 2005224939 A | 8/2005 |

* cited by examiner

TOOL DEVICE—WITH MODULE ATTACHMENTS

CROSS-REFERENCE TO RELATED APPLICATIONS

This patent application is the U.S. National Stage of International Patent Application No. PCT/EP2017/082407, filed Dec. 12, 2017, which claims the benefit of European Patent Application No. 16206612.0, filed Dec. 23, 2016, which are each incorporated by reference.

The invention relates to a tool device consisting of a plurality of modules that can be detached from one another, for example, a setting tool for setting fastening elements, such as nails, bolts, rivets, screws, anchors, or a hammer drill.

BACKGROUND OF THE INVENTION

From the prior art, tool devices are known which each comprise a first module and a second module that can be detached from the first module. It is known to provide the first module with a thread and the second module with a counter-thread, and so the second module can be unscrewed from the first module. However, this is time-consuming.

BRIEF SUMMARY OF THE INVENTION

The invention addresses the problem of providing a tool device, in which a first module can be detached from a second module in a quick and/or simple manner.

According to one aspect of the application, a tool device comprises a first module and a second module that can be detached from the first module, said first module having a receptacle and said second module having an insertion part that can be inserted in the receptacle along an insertion axis which defines an insertion direction. The insertion part can be rotated in the receptacle about the insertion axis in one rotational direction between a locked position and an enabled position, wherein the receptacle has a plurality of first projections arranged consecutively in the insertion direction, and the insertion part has a plurality of second projections arranged consecutively in the insertion direction. In the locked position, one second projection engages behind one first projection each in the direction of the insertion axis, while in the enabled position, the first projections enable the second projections to pass in the direction of the insertion axis.

One advantageous embodiment is characterized in that the first projections are arranged adjacent to one another in the rotational direction about the insertion axis. A further advantageous embodiment is characterized in that the second projections are arranged adjacent to one another in the rotational direction about the insertion axis.

One advantageous embodiment is characterized in that, on its side facing away from the second module, a first projection has a first slope rising along the insertion axis. Preferably, the steepness of the first slopes of a plurality of first projections differs along the insertion axis. Particularly preferably, the steepness of the first slopes increases from one to the next first projection in the direction away from the second module.

One advantageous embodiment is characterized in that a plurality of first projections has a different radial height in relation to the insertion axis. Preferably, the first projections increase in height from one to the next first projection along the insertion axis away from the second module.

One advantageous embodiment is characterized in that, on its side facing away from the first module, a second projection has a first slope rising along the insertion axis. Preferably, the steepness of the second slopes of a plurality of second projections differs along the insertion axis. Particularly preferably, the steepness of the second slopes increases from one to the next second projection in the direction away from the first module.

One advantageous embodiment is characterized in that a plurality of second projections has a different radial height in relation to the insertion axis. Preferably, the second projections increase in height from one to the next second projection along the insertion axis away from the first module.

One advantageous embodiment is characterized in that a first projection, which faces the second module along the insertion axis in the frontmost position, has a first insertion ramp which is tilted toward a circumferential direction about the insertion axis. A further advantageous embodiment is characterized in that a second projection, which faces the first module along the insertion axis in the frontmost position, has a second insertion ramp which is tilted toward a circumferential direction about the setting axis.

According to a further aspect of the application, a tool device comprises a first module and a second module that can be detached from the first module, said first module having a receptacle and said second module having an insertion part that can be inserted in the receptacle along an insertion axis which defines an insertion direction. The insertion part can be rotated in the receptacle about the insertion axis in one rotational direction between a locked position and an enabled position. The receptacle has a first projection and the insertion part has a second projection, wherein, in the locked position, the second projection engages behind the first projection in the direction of the insertion axis, and in the enabled position, the first projection enables the second projection to pass in the direction of the insertion axis. The tool device has a locking means with a locking position and an unlocking position, wherein, in the locking position, the locking means prevents a detachment of the second module from the first module, and in the unlocking position allows said detachment.

One advantageous embodiment is characterized in that the locking means has a bolt arranged on one of the two modules and a bolt slot arranged on the other of the two modules, and wherein, in the locking position, the bolt engages in the bolt slot, and in the unlocking position, said bolt is arranged outside of the bolt slot. The other one of the two modules preferably has a connecting link which, relative to the other module, is rotatably arranged about the insertion axis and comprises the bolt slot. Preferably, the bolt also moves, relative to the insertion axis, radially inwardly into the bolt slot during the transition from the unlocking position to the locking position. Alternatively, the bolt moves, relative to the insertion axis, radially outwardly into the bolt slot during the transition from the unlocking position to the locking position.

One advantageous embodiment is characterized in that the locking means has an actuation element. Preferably, the actuation element is rigidly connected to the bolt.

One advantageous embodiment is characterized in that the locking means has a bolt spring, which loads the bolt and the bolt slot toward one another.

One advantageous embodiment is characterized in that, in the locking position, the locking means blocks a shifting of the insertion part relative to the receptacle along the insertion axis, and in the unlocking position, it allows said shifting.

One advantageous embodiment is characterized in that the locking means has a plurality of bolt slots arranged on the other one of the two modules.

One advantageous embodiment is characterized in that the insertion part is rotatable in the receptacle between several locked positions and several enabled positions about the insertion axis.

One advantageous embodiment is characterized in that the tool device comprises a catch means, having a catch element and a catch seat, wherein, in the locked position, the catch element engages in the catch seat. Preferably, the catch element is arranged on one of the two modules, and the catch seat is arranged on the other one of the two modules. The catch element is preferably also arranged on the other one of the modules and the catch seat is arranged on the connecting link. The catch seat is preferably also arranged on the other one of the two modules and the catch element is arranged on the connecting link.

One advantageous embodiment is characterized in that the tool device further comprises a safety device, having a secured position and an unlocked position, wherein, in the secured position, the safety device prevents an activation of the tool device, and in the unlocked position, it allows said activation. The tool device further comprises an unlocking interlock which, in the enabled position, blocks a transition of the safety device from the secured position to the unlocked position, and in the locked position allows said transition. Preferably the unlocking interlock has a first blocking element arranged on the first module and a second blocking element arranged on the second module, wherein, in the enabled position, the first blocking element and the second blocking element block one another, and in the locked position, they are enabled to pass one another. Preferably, the unlocking interlock also comprises a plurality of first blocking elements and/or a plurality of second blocking elements.

One advantageous embodiment is characterized in that, in the locking position, the locking means blocks a rotation of the insertion part in the receptacle about the insertion axis, and in the unlocking position, it allows said rotation.

One advantageous embodiment is characterized in that, during the transition from the unlocking position to the locking position, the bolt moves along the insertion axis into the bolt slot.

According to a further aspect of the application, the tool device comprises a first module and a second module that can be detached from the first module, said first module having a receptacle and said second module having an insertion part that can be inserted in the receptacle along an insertion axis which defines an insertion direction. The insertion part can be rotated in the receptacle about the insertion axis in one rotational direction between a locked position and an enabled position. The receptacle has a first projection and the insertion part has a second projection, wherein in the locked position, the second projection engages behind the first projection in the direction of the insertion axis, while in the enabled position, the first projection enables the second projection to pass in the direction of the insertion axis. One of the two modules comprises a locking member and a support member, wherein the locking member has an outer locking contour which faces the other one of the two modules, and an inner locking contour which faces away from the other one of the two modules. The other one of the two modules has a counter contour which faces the locking member, wherein, in a locked position of the locking member, the outer locking contour engages in the counter contour in order to block a rotation of one of the two modules relative to the other one of the two modules about the insertion axis. The support member has a support contour, which in a holding position of the support member, supports the inner locking contour in the direction of the insertion axis in order to hold the locking member in the locked position, and in a release position of the support member, said support contour allows the locking member to disengage from the locked position along the insertion axis.

One advantageous embodiment is characterized in that the support member is transferable from the holding position to the release position by rotating the support member relative to the locking member about the insertion axis.

One advantageous embodiment is characterized in that the inner locking contour and/or the support contour has an insertion slope for facilitating a transfer of the support member from the release position to the holding position.

One advantageous embodiment is characterized in that the outer locking contour and/or the counter contour has a disengagement ramp for facilitating a disengaging of the locking member from the locked position.

One advantageous embodiment is characterized in that the tool device comprises a support spring which preloads the support member with regard to the locking member in the holding position.

One advantageous embodiment is characterized in that the one of the two modules is rotatable about the insertion axis relative to the other one of the two modules between a plurality of catch positions, when the locking member is disengaged from the locked position, and wherein the one of the two modules, relative to the other one of the two modules, is set in one of the catch positions, when the locking member is engaged in the locked position. Preferably, the catch positions comprise an operating position, in which the tool device is operably in its intended function, and a disassembly position, in which one of the two modules can be detached from the other module.

According to a further aspect of the application, the tool device comprises a first module and a second module that can be detached from the first module, said first module having a receptacle and said second module having an insertion part that can be inserted in the receptacle along an insertion axis which defines an insertion direction. The insertion part can be rotated in the receptacle about the insertion axis in one rotational direction between a locked position and an enabled position. The receptacle has a first projection and the insertion part has a second projection, wherein in the locked position, the second projection engages behind the first projection in the direction of the insertion axis, while in the enabled position, the first projection enables the second projection to pass in the direction of the insertion axis. In an initial position, the receptacle prevents an activation of the tool device, and in a pressed-on position, it allows the activation of the tool device, wherein the pressing of the second module onto the second module transfers the receptacle in the direction of the insertion axis to the pressed-on position, while the insertion part in the receptacle is in the locked position.

One advantageous embodiment is characterized in that the first module comprises a pressed-on locking element, which is moved jointly with the receptacle along the insertion axis, and a pressed-on blocking element, wherein the pressed-on locking element, relative to the receptacle, is rotatable about the insertion axis between a normal position and a disassembly position. The pressed-on blocking element allows a transfer of the receptacle to the pressed-on position, when the pressed-on locking element is in the normal position, while the pressed-on blocking element blocks a transfer of the receptacle to the pressed-on position, when the pressed-on locking element is in the disassembly position.

One advantageous embodiment is characterized in that the pressed-on locking element has a pressed-on locking contour, the movement of which along the insertion axis is blocked by the pressed-on blocking element, when the pressed-on locking element is in the disassembly position.

One advantageous embodiment is characterized in that the pressed-on locking element has a drive element, wherein the second module has a driver, which engages in the drive element, when the insertion part is inserted in the receptacle.

One advantageous embodiment is characterized in that a rotation of the insertion part from the locked position to the enabled position effects a joint rotation of the pressed-on locking element from the normal position to the disassembly position. A further advantageous embodiment is characterized in that a rotation of the insertion part from the enabled position to the locked position effects a joint rotation of the pressed-on locking element from the disassembly position to the normal position.

One advantageous embodiment is characterized in that the pressed-on locking element comprises a sleeve arranged about the insertion axis.

One advantageous embodiment is characterized in that the tool device comprises a driving-in element for transferring energy to a fastening element to be driven in, and a power-operated drive means for driving the driving-in element. Preferably, the first module comprises the drive means, the driving-in element, a guide cylinder for the driving-in element and/or an operating element. The second module preferably also comprises the driving-in element, a guide cylinder for the driving-in element, an operating element and/or a magazine for the fastening element.

BRIEF DESCRIPTION OF THE SEVERAL VIEWS OF THE DRAWINGS

Further features and advantages of the invention can be derived from the embodiments which, in the following, are described in more detail using the attached drawings.

DETAILED DESCRIPTION OF THE INVENTION

Figure 1:
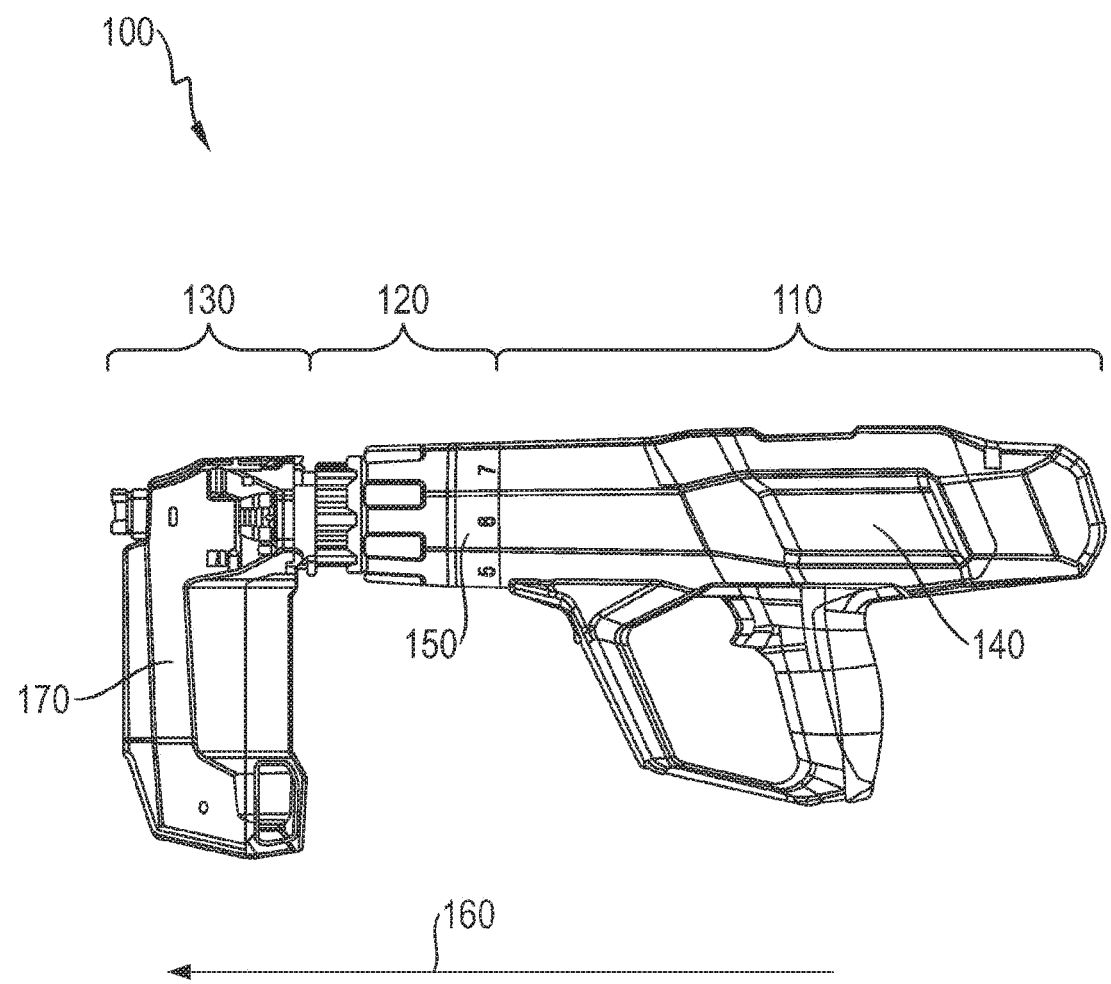
FIG. 1 shows a side view of a tool device.

FIG. 1 shows a side view of a first embodiment of a tool device 100. The tool device 100 comprises a drive module 110, an energy adjustment module 120, and a magazine module 130, wherein the magazine module 130 is inserted in the energy adjustment module 120 in a detachable manner, and wherein the energy adjustment module 120 is inserted in the drive module 110 in a detachable manner. In embodiments not depicted, the drive module, for example, is inserted in the energy adjustment module or the energy adjustment module is inserted in the magazine module.

The tool device 100 is designed as a setting tool for setting fastening elements (not depicted), such as nails, bolts, rivets, and the like, and comprises a driving-in element designed, for example, as a setting piston (not depicted), for transferring energy to a fastening element to be driven in, and a force-operated drive means (not depicted) for driving the driving-in element. The first module 110 comprises a housing 140, the drive means accommodated in the housing 140, and a guide cylinder for the driving-in element, also accommodated in the housing 140. The second module 120 comprises an operating element 150, and the magazine module 130 comprises a driving-in channel, in which a fastening element is driven by the driving-in element in a setting direction 160 into a substrate made, for example, of steel, concrete, or wood, and a magazine 170 for introducing fastening elements into the driving-in channel.

The drive means comprises, for example, a powder- or gas-powered combustion chamber, an air-powered pressure chamber, a mechanical or pneumatic spring, or an electrically powered flywheel. A driving-in energy to be transferred to the fastening element can be adjusted with the operating element 150.

Figure 2:
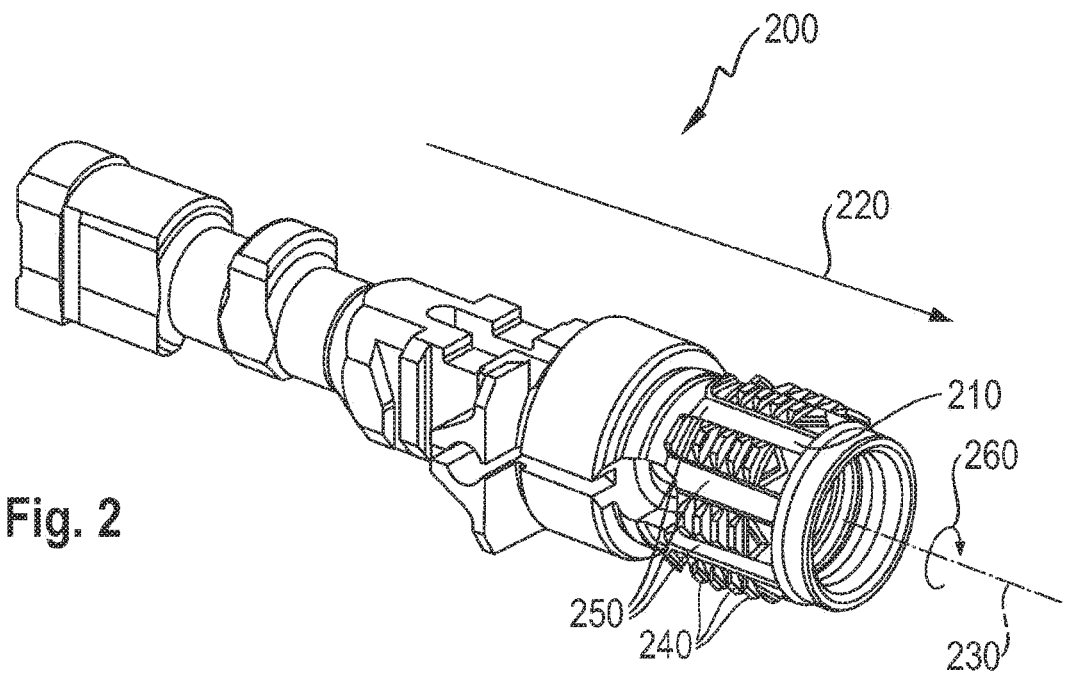
FIG. 2 shows a section of a module of a tool device.
Figure 3:
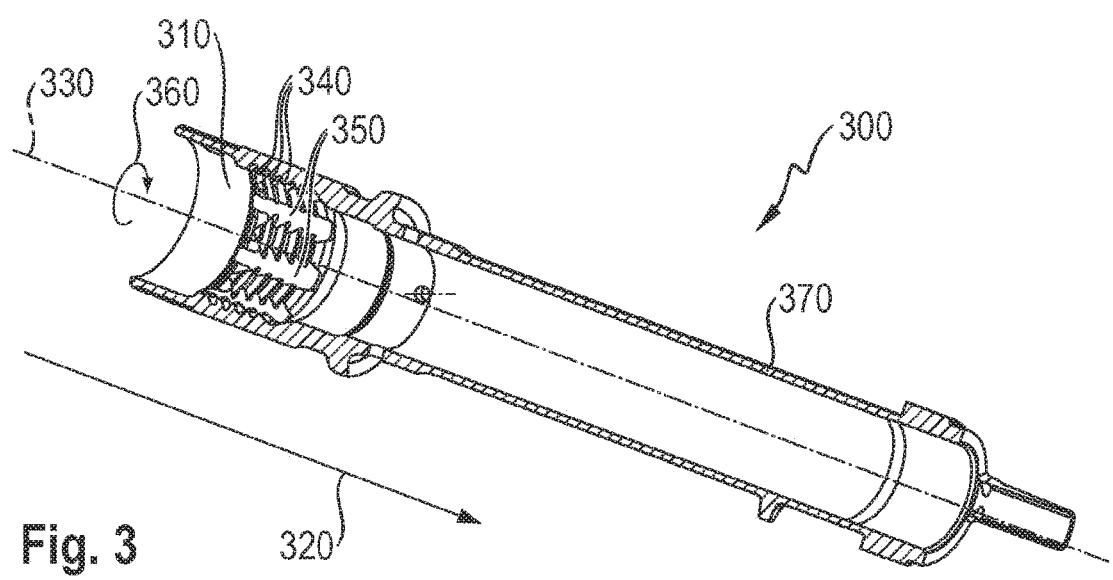
FIG. 3 shows a cross-sectional view of a section of a module of a tool device.

FIG. 2 shows a magazine module 200, having a magazine (not depicted). The magazine module 200 comprises an insertion part 210, which can be inserted in a receptacle 310 (FIG. 3) along an insertion axis 230 which defines an insertion direction 220. The insertion part 210 has a plurality of second projections 240 which are arranged consecutively in the insertion direction 220, and which are provided, in a locked position of the insertion part 210 relative to the receptacle 310, to each engage behind one first projection 340 of the receptacle 310 (FIG. 3). In a circumferential direction about the insertion axis 230 between the two projections 240, the insertion part 210 has second gaps 250 which are provided, in an enabled position of the insertion part 210 relative to the receptacle 310, to enable the first projections 340 of the receptacle 310 to pass along the insertion axis 230. For that purpose, the insertion part 210 is rotatable in the receptacle 310 between the locked position and the enabled position about the insertion axis 230 in a rotational direction 260. In the insertion direction 220, the second projections 240 are arranged one behind the other, and in the rotational direction 260, they are arranged adjacent to one another. In the present embodiment, the second gaps 250 are each offset to one another by 45° along the rotational direction 260, and so eight different enabled positions are overall provided along a circumferential direction about the insertion axis 230.

FIG. 3 shows a drive module 300, having a drive (not depicted) for a driving-in element (not depicted) which is guided in a guide cylinder 370. The drive module comprises a receptacle 310, in which an insertion part 210 (FIG. 2) can be inserted along an insertion axis 330 which defines an insertion direction 320. The receptacle 310 comprises a plurality of first projections 340 which are arranged consecutively in the insertion direction 320 and which are provided, in a locked position of the insertion part 210 relative to the receptacle 310, to each engage behind a second projection 240 of the insertion part 210 (FIG. 2). In a circumferential direction about the insertion axis 330, the receptacle 310 has first gaps 350 between the first projections 340, said gaps 350 being provided, in an enabled position of the insertion part 210 relative to the receptacle 310, to enable the second projections 240 of the insertion part 210 to pass along the insertion axis 330. For that purpose, the insertion part 210 is rotatable in the receptacle between the locked position and the enabled position in a rotational direction 360 about the insertion axis 330. In the insertion direction 320, the first projections 340 are arranged one behind the other, and in the rotational direction 360, they are arranged adjacent to one another.

Figure 4:
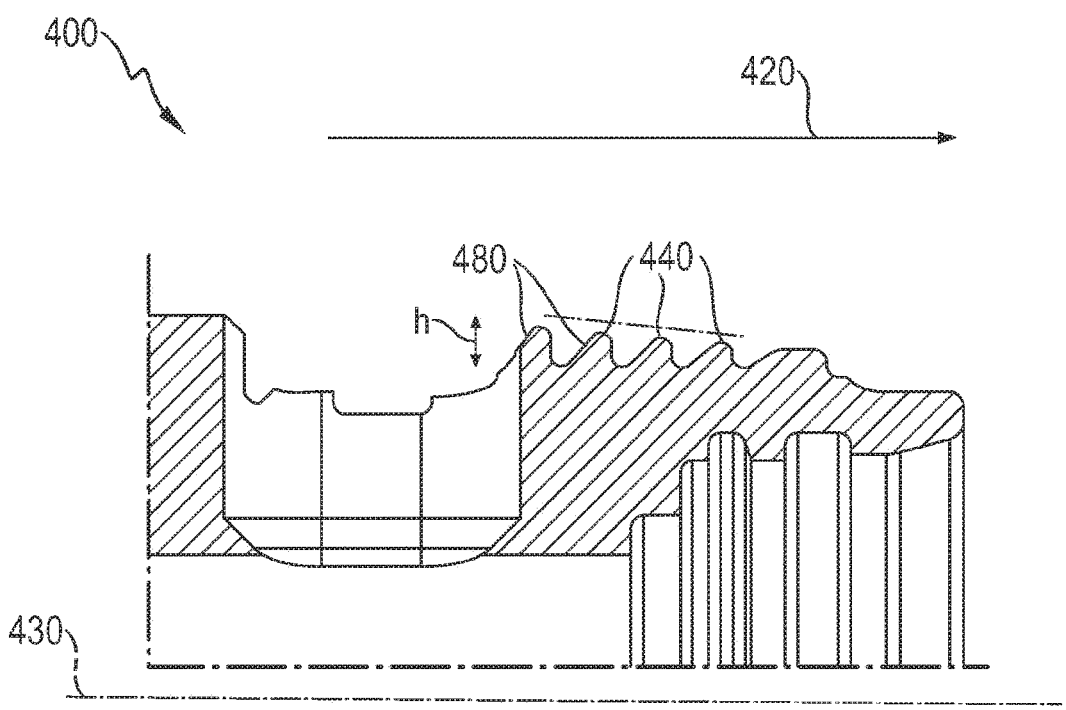
FIG. 4 shows a cross-sectional view of a section of an insertion part.

FIG. 4 shows a cross-sectional view of a section of an insertion part 400 which can be inserted in a receptacle (not depicted) along an insertion axis 430 which defines an insertion direction 420. The insertion part 400 has a plurality of second projections 440 which are arranged consecutively in the insertion direction 420 and which are provided, in a locked position of the insertion part 400 relative to the receptacle, to each engage behind a first projection of the receptacle.

On the side facing away from the insertion direction 420, the second projections 440 each comprise a second slope 480 which rises along the insertion axis 430. The steepness of the second slopes 480 increases against the insertion direction 420 from one to the next second projection 440. As a result, forces acting between the insertion part 400 and the receptacle are distributed more evenly to the individual second projections 440. In addition, the second projections 440 increase in height from one to the next second projection 440 against the insertion direction 420 with regard to a radial height h relative to the insertion axis. As a result, the insertion part 400 can only be rotated about the insertion axis 430 in a rotational direction relative to the receptacle, when the insertion part 400 is inserted in the receptacle at a desired depth.

Figure 5:
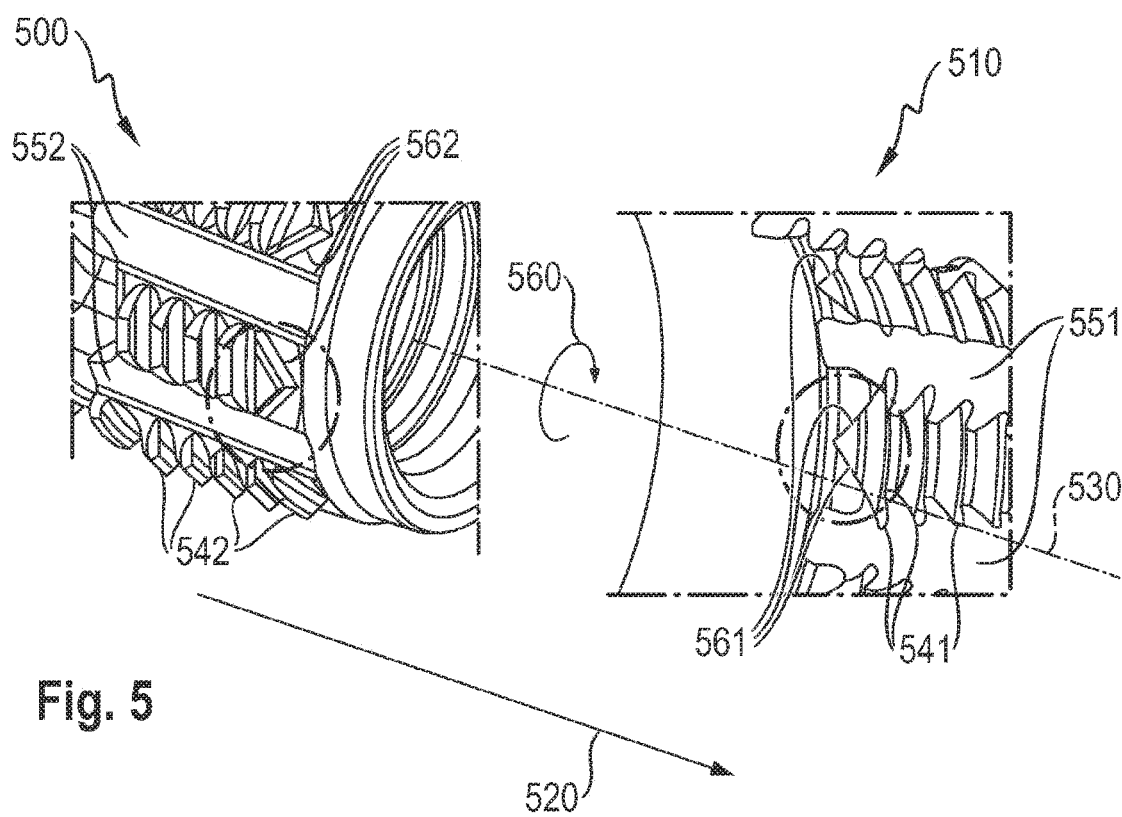
FIG. 5 shows a section of an insertion part and a receptacle.

FIG. 5 shows a section of an insertion part 500 and a receptacle 510, wherein the insertion part 500 can be inserted in the receptacle 510 along an insertion axis 530 which defines an insertion direction 520. The receptacle 510 comprises a plurality of first projections 541 which are arranged consecutively in the insertion direction 520. The insertion part 500 comprises a plurality of second projections 542 which are arranged consecutively in the insertion direction 520 and which are provided, in a locked position of the insertion part 500 relative to the receptacle 510, to each engage behind a first projection 541 of the receptacle 510. In a circumferential direction about the insertion axis 530, the receptacle 510 and the insertion part 500 have first gaps 551 and second gaps 552, respectively, between the first projections 541 and the second projections 542, said gaps 551, 552 being provided, in an enabled position of the insertion part 500 relative to the receptacle 510, to enable the second projections 542 or the first projections 541 to pass along the insertion axis 530. For that purpose, the insertion part 500 is rotatable in the receptacle 510 between the locked position and the enabled position in a rotational direction 560 about the insertion axis 530.

In the insertion direction 520, the first projections 541 and the second projections 542 are each arranged one behind the other. The first projections 541, which face the insertion part 500 along the insertion axis 530 in the frontmost position, each have two first insertion ramps 561 which are tilted toward the rotational direction 560. This facilitates the finding of the enabled position, when the insertion part 500 is inserted in the receptacle 510. The second projections 542, which face the receptacle along the insertion axis 530 in the frontmost position, also each have two second insertion ramps 562 which are tilted toward the rotational direction 560.

Figure 6:
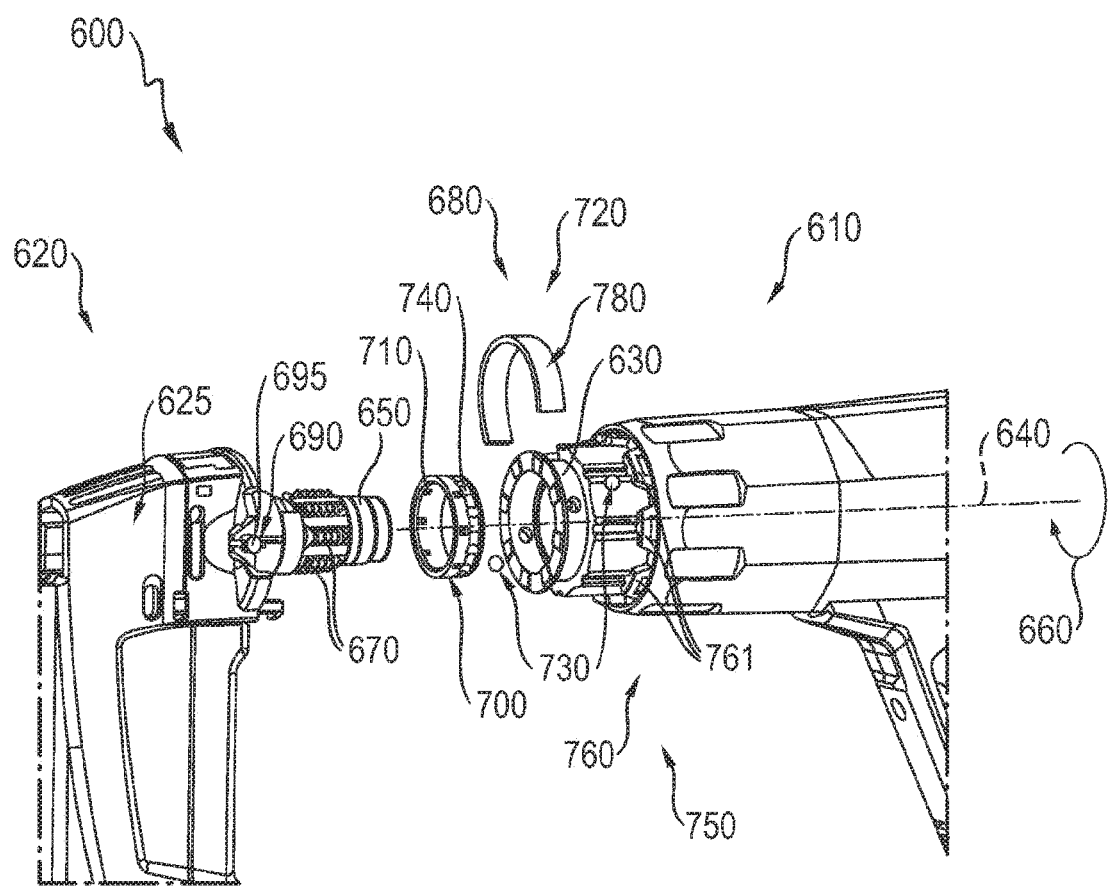
FIG. 6 shows an exploded view of a section of a tool device.

FIG. 6 shows an exploded view of a section of a tool device 600. The tool device 600 comprises a drive module 610 and a magazine module 620 which has a magazine 625 and is detachable from the drive module 610. The drive module 610 has a receptacle 630. The magazine module 620 has an insertion part 650 which can be inserted in the receptacle 630 along an insertion axis 640. The insertion part 650 is rotatable in the receptacle 630 in a rotational direction 660 between several alternating locked positions and enabled positions about the insertion axis 640. The receptacle 630 has first projections (not depicted), and the insertion part 650 has second projections 670, wherein, in the locked position, the second projections 670 engage behind the first projections in the direction of the insertion axis 640, and in the enabled position, the first projections enable the second projections to pass in the direction of the insertion axis 640.

Figure 7:
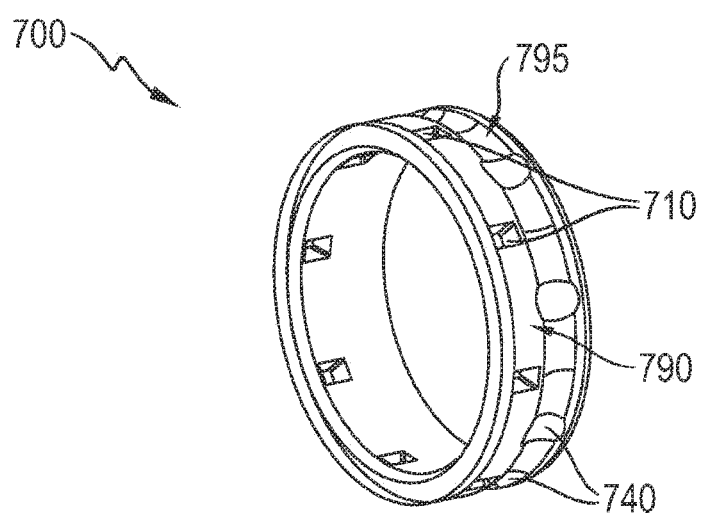
FIG. 7 shows a connecting link.

The tool device 600 comprises a locking means 680 with a locking position and an unlocking position, wherein, in the locking position, the locking means 680 prevents a detachment of the magazine module 620 from the drive module 610, and in the unlocking position allows said detachment. The locking means 680 comprises a bolt 690 arranged on the magazine module 620 and a connecting link 700 which is arranged on the drive module 610 and has a multiplicity of bolt slots 710 (FIG. 7). The locking means 680 further comprises an actuation element 695 which is rigidly connected to the bolt 690.

The tool device 600 further comprises a catch means 720 having two catch elements 730 and a multiplicity of catch seats 740, wherein the catch elements 730 each engage in one of the catch seats 740, when the insertion part 750, relative to the receptacle 730, is in the locked position. The catch elements 730 are arranged on the receptacle 630 and thus on the drive module 610, while the catch seats 740 are arranged on the connecting link 700. The catch elements 730 are designed as spheres which are arranged in sphere seats 770 in the receptacle 630 and loaded by an external annular spring 780 inwardly onto the connecting link 700. In embodiments which are not depicted, one or more catch elements, arranged on the drive module or the connecting link, and one or more catch seats, arranged on the connecting link or the drive module, are provided.

The tool device 600 further comprises a safety device 750 having a secured position and an unlocked position, wherein, in the secured position, the safety device 750 prevents an activation of the tool device 600, and in the unlocked position, it allows said activation. In the enabled position, an unlocking interlock 760 of the safety device 750 blocks a transition of the safety device 750 from the secured position to the unlocked position, and in the locked position allows said transition. The unlocking interlock 760 comprises a plurality of first blocking elements 761 arranged on the drive module 610 and a plurality of second blocking elements 862 (FIG. 8) arranged on the connecting link 700, wherein, in the enabled position, the first blocking elements 761 and the second blocking elements 862 block one another, and in the locked position, they are enabled to pass one another along the insertion axis 640.

FIG. 7 shows the connecting link 700 which is designed as a connecting ring 790 and, in addition to the bolt slots 710, has a continuous groove 765, in which the catch seats 740 are arranged. When the connecting link 700 is rotated relative to the receptacle 630 in the rotational direction, the catch elements 730 run in the groove 795 and engage in the catch seats 740, when the insertion part 650 is in the locked position relative to the receptacle 630. In such case, the connecting link 700 is jointly rotated with the insertion part 650 via the locking means 680.

Figure 8:
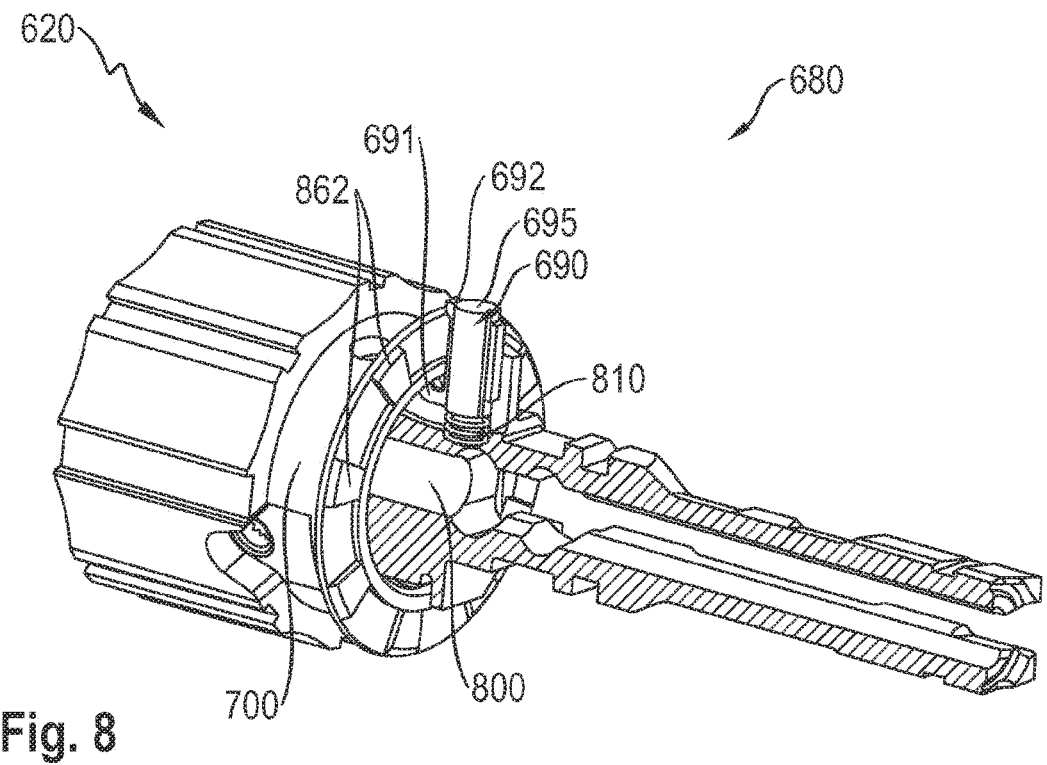
FIG. 8 shows a section of a module of a tool device in a first position.
Figure 9:
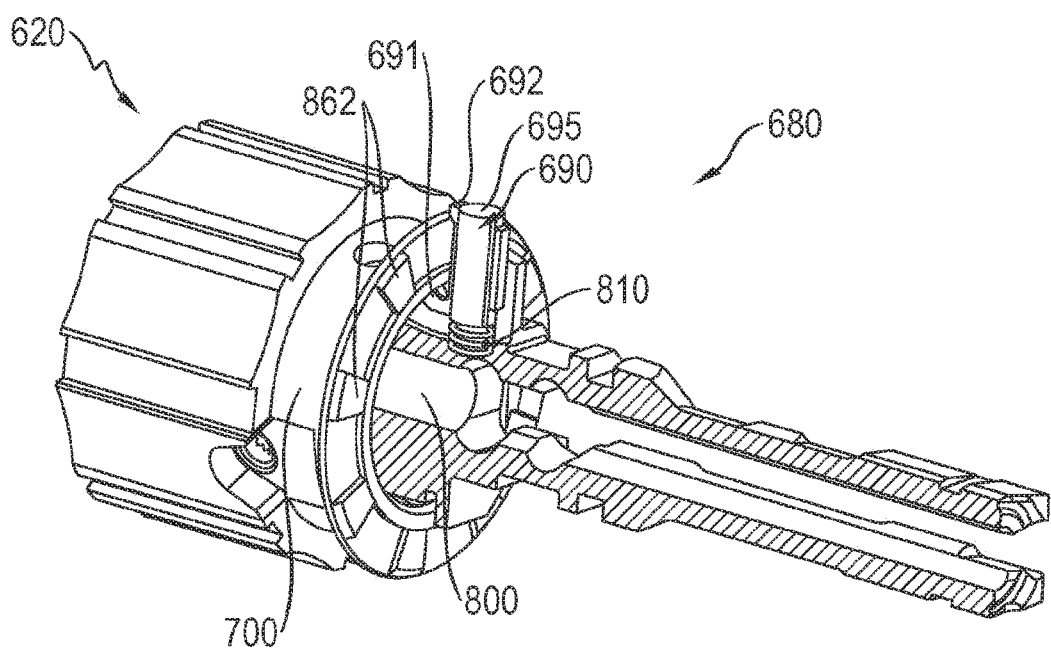
FIG. 9 shows a section of a module of a tool device in a second position.
Figure 10:
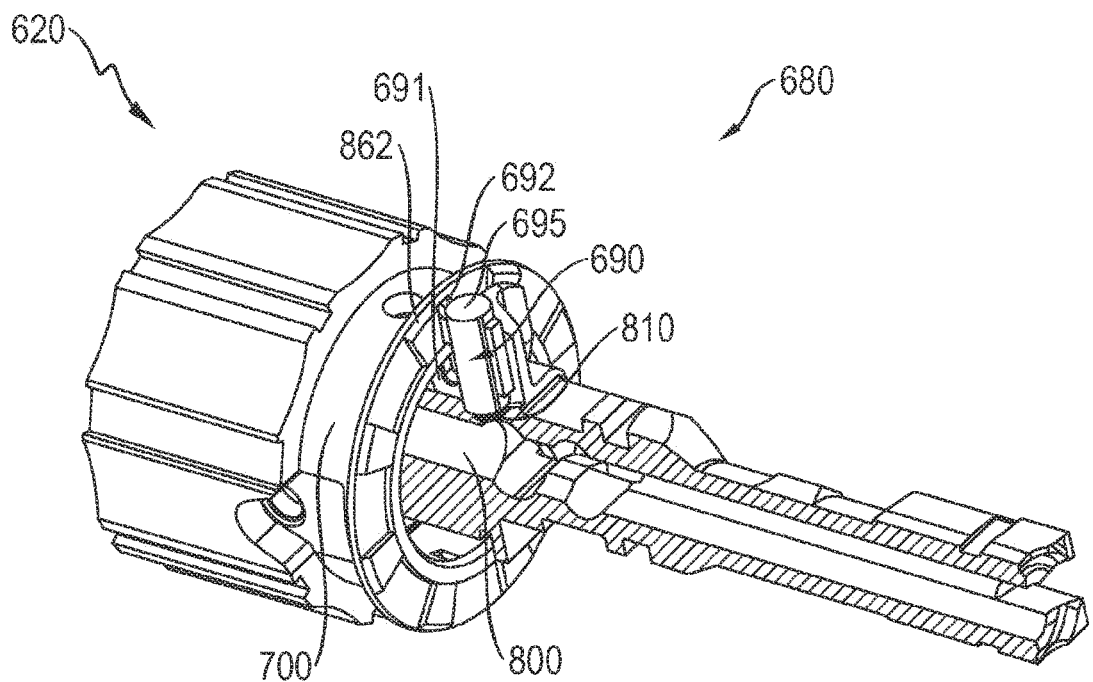
FIG. 10 shows a section of a module of a tool device in a third position.

FIGS. 8, 9, and 10 show the magazine module 620 with the bolt 690 together with the connecting link 700, wherein covering parts of the magazine module 620, such as the insertion part, are not depicted, and so the driving-in channel 800 can be seen in the magazine module 620. With regard to the insertion axis 640, the bolt 690 engages with a bolt extension 691 radially outwardly in one of the bolt slots (not depicted) of the connecting link 700, and so the locking means 680 is in a locking position. The locking means 680 comprises a bolt spring 810 which loads the bolt 690 and the bolt seat toward one another, and so the locking means 680 is held in the locking position.

In the locking position according to FIG. 8, the locking means 680 blocks a shifting of the insertion part relative to the receptacle along the insertion axis and a rotation of the insertion part in the receptacle about the insertion axis. However, a rotation of the magazine module 620 relative to the drive module 610 is possible, wherein the connecting link 700 in the locking position of the locking means 680 jointly rotates with the magazine module 620 from one catch position of the catch means 720 to the next.

FIG. 9 shows the magazine module 620 and the connecting link 700 in such a further catch position of the catch means 720. The locking means 680 is still in the locking position.

FIG. 10 shows the magazine module 620 and the connecting link 700 after the actuation element 695, and thus the bolt 690 was moved against the force of the spring radially inwardly with regard to the insertion axis 640. As a result, the bolt extension 691 has moved out of the bolt slot, and so the locking means 680 is now in the unlocking position. In the unlocking position, the locking means 680 releases a shifting of the insertion part relative to the receptacle along the insertion axis and a rotation of the insertion part in the receptacle about the insertion axis, and so, by rotating in the rotational direction, the magazine module 620 rotates the insertion part, relative to the receptacle, to the enabled position, after which the magazine module 620 can be pulled out of the drive module.

During the transition from the unlocking position to the locking position, the bolt 690 moves, relative to the insertion axis, radially outwardly into the bolt slot. In embodiments not depicted, the bolt moves, relative to the insertion axis, radially outwardly or along the insertion axis into the bolt slot during the transition from the unlocking position to the locking position.

Figure 11:
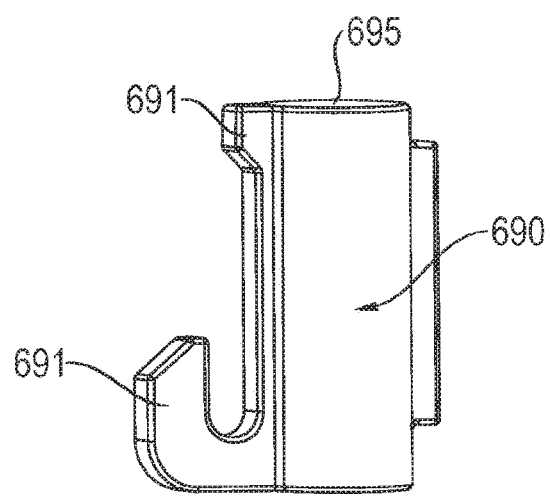
FIG. 11 shows a bolt.

FIG. 11 shows the bolt 690 with the bolt extension 691 and a stop 692 which, in the unlocking position, bears against one of the blocking elements 862, when the magazine module 620 is rotated to the enabled position. The actuation element 695 is rigidly connected to the bolt 690 and forms an integral element with said bolt 690.

Figure 12:
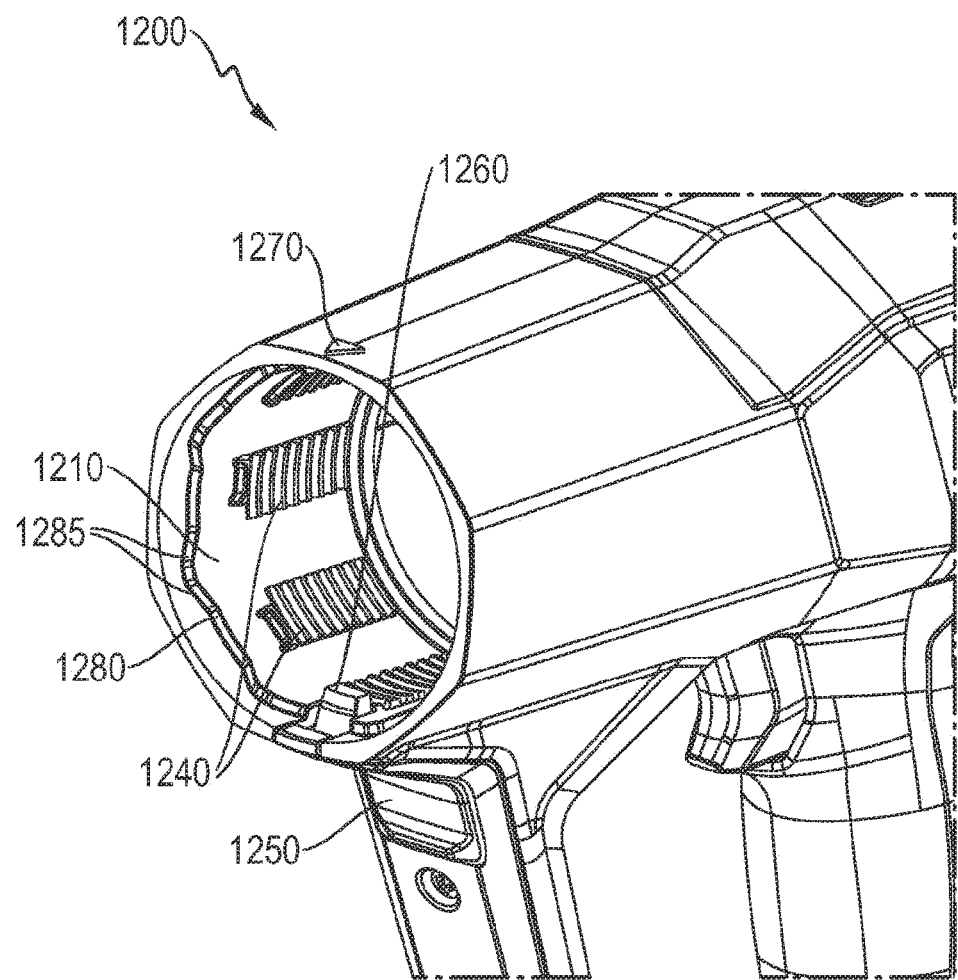
FIG. 12 shows a section of a module of a tool device.

FIG. 12 shows a section of a drive module 1200 of a tool device. The drive module 1200 comprises a receptacle 1210 with a plurality of first projections 1240. An insertion part of a further module of the tool device can be inserted in the receptacle 1210. The drive module 1200 comprises a lock 1260 which, in the normal position shown in FIG. 12, secures an insertion part inserted in the receptacle 1210 against a rotation relative to the receptacle 1210. A push button 1250 is rigidly connected to the lock 1260 and must be pressed in order to rotate the insertion part in the receptacle 1210 and to be able to remove the further module form the drive module 1200. In addition, the drive module has a first indicator arrow 1270.

Figure 13:
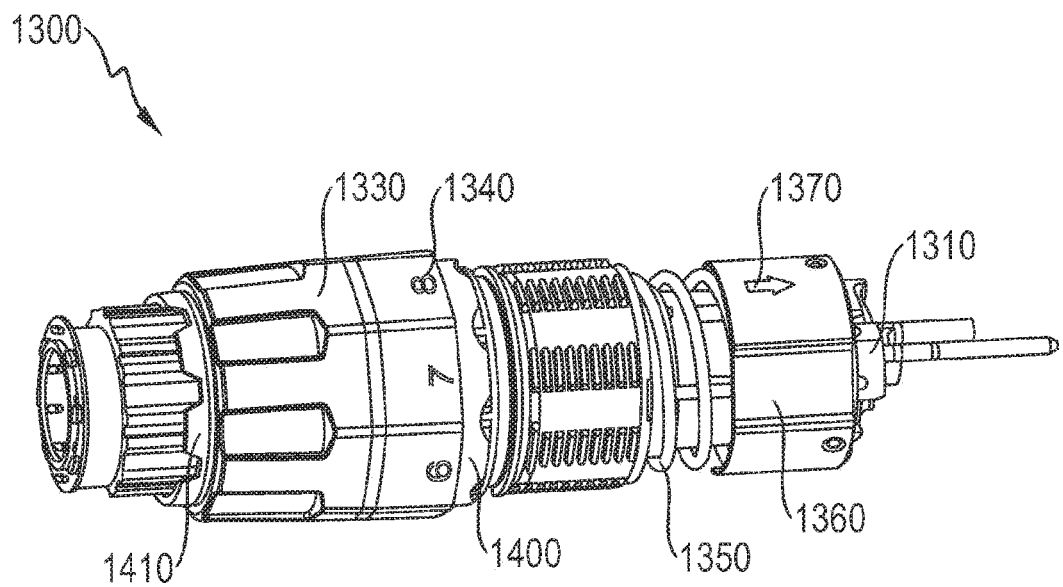
FIG. 13 shows a module of a tool device.

FIG. 13 shows an operating module 1300 of a tool device. The operating module 1300 has an insertion part 1310, having second projections (not depicted) which are provided for engaging behind the first projections 1240 of the drive module 1200 (FIG. 12), when the insertion part 1310 is inserted in the receptacle 1210 and is rotated relative to the receptacle 1210. The operating module 1300 comprises an adjustment sleeve 1330, with which a driving-in energy of the tool device can be adjusted. For that purpose, the adjustment sleeve carries an energy scale 1340. The operating module further comprises a pressure spring 1350 and a spring bearing 1360 for supporting the pressure spring 1350. The spring bearing 1360 carries a second indicator arrow 1370 which must come into alignment with the first indicator arrow 1270 of the drive module 1200 (FIG. 12) to ensure that the operating module 1300 can be attached to the drive module 1200 in the desired position.

Figure 14:
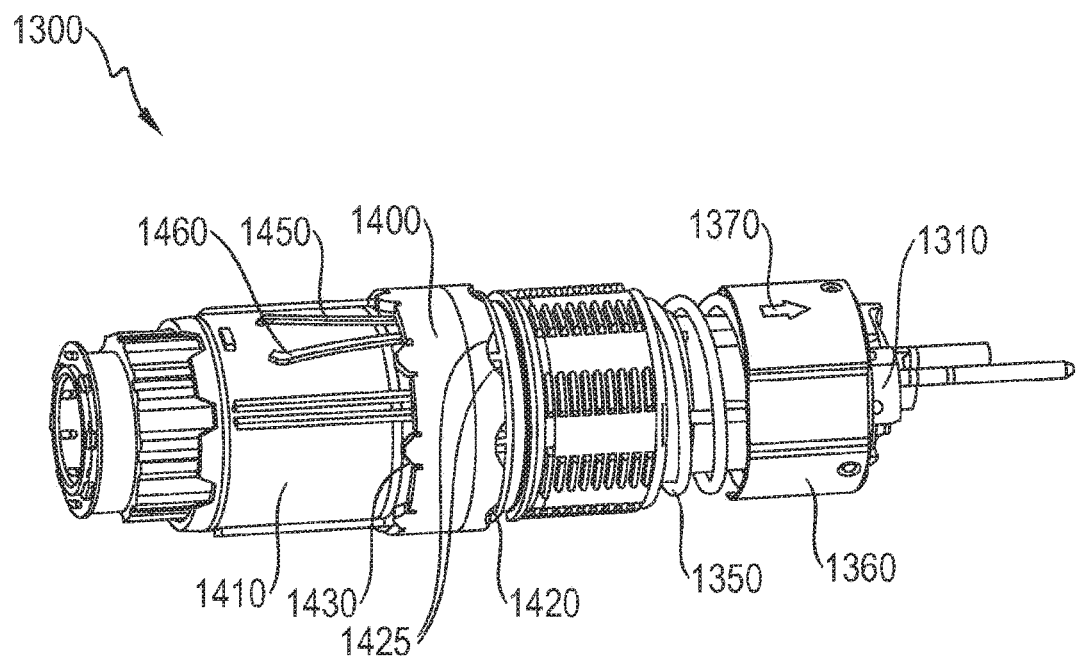
FIG. 14 shows a module of a tool device.

FIG. 14 shows the operating module 1300 without the adjustment sleeve. Below the adjustment sleeve, the operating module 1300 comprises a locking member 1400 and a support member 1410, wherein the locking member 1400 has an outer locking contour 1420 which faces the drive module 1200, and an inner locking contour 1430 which faces away from the drive module 1200. The drive module 1200 has a counter contour 1280 which faces the locking member 1400, wherein, in a locked position of the locking member 1400, the outer locking contour 1420 engages in the counter contour 1280 in order to block a rotation of the operating module 1300 with regard to the drive module 1200. The support member 1410 has a support contour 1440.

Figure 15:
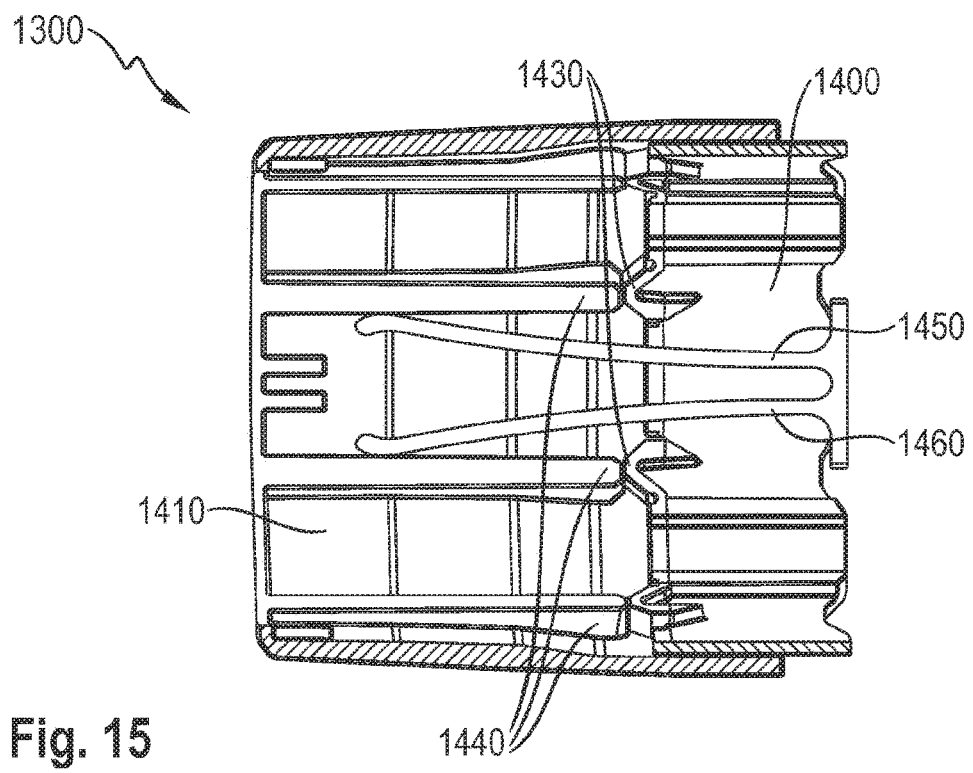
FIG. 15 shows a section of a module of a tool device in a first position.

FIG. 15 shows a section of the operating module 1300, wherein the support member 1410 is in a holding position. In the holding position, the support contour 1440 supports the inner locking contour 1430 in the direction of the insertion axis in order to hold the locking member 1400 in the locked position.

Figure 16:
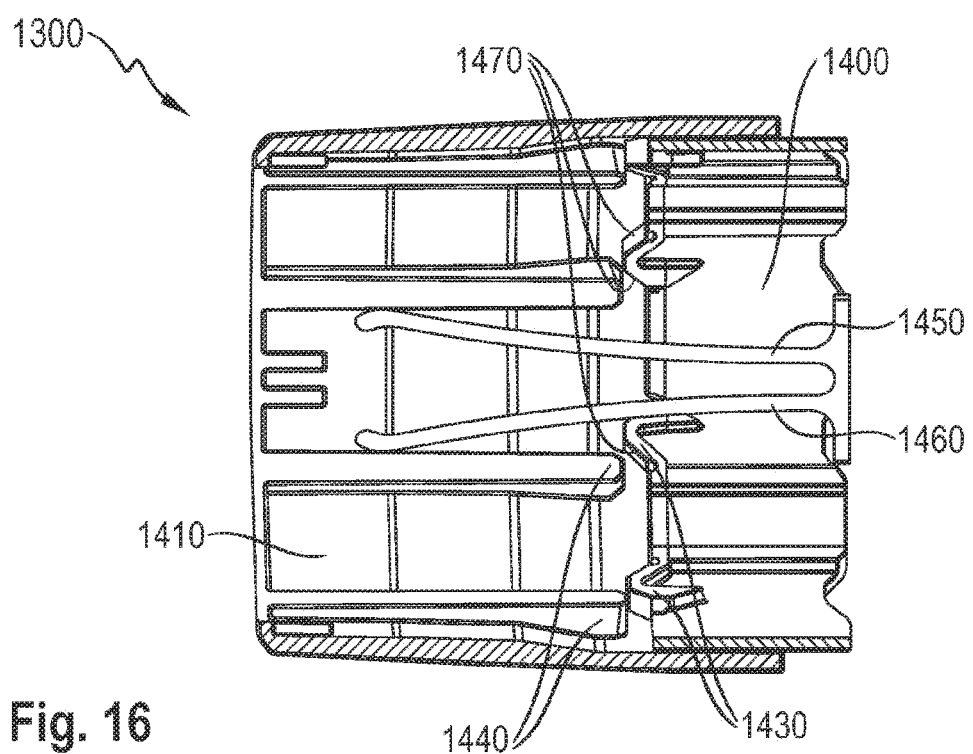
FIG. 16 shows a section of a module of a tool device in a second position.

FIG. 16 shows a section of the operating module 1300, wherein the support member 1410 is in a release position. In the release position, the support contour 1440 allows the locking member 1400 to disengage from the locked position along the insertion axis.

The support member 1410 can be transferred from the holding position to the release position by rotating the support member 1410 relative to the locking member 1400 about the insertion axis. The inner locking contour 1430 and the support contour 1440 have insertion slopes 1470 for facilitating a transfer of the support member 1410 from the release position to the holding position. In addition, the outer locking contour 1420 (FIG. 14) and the counter contour 1280 (FIG. 12) have disengagement ramps 1425, 1285 for facilitating a disengaging of the locking member 1400 from the locked position with regard to the drive module 1200. The operating module 1300 further comprises a first support spring 1450 and a second support spring 1460 which preload the support member 1410 with regard to the locking member 1400 in the holding position.

If the adjustment sleeve 1330 is rotated about the insertion axis, the first support spring 1450 or the second support spring 1460, depending on the rotational direction, is deflected, and so the support member 1410, against the spring force of the first or second support spring 1450, 1460, is transferred to the release position. The locking member 1400 can now disengage from the locked position and also be rotated relative to the drive module 1200. It is also possible to adjust the energy with one hand, while the other hand holds the drive module 1200.

For that purpose, the locking member 1400 can engage in several catch positions of the counter contour 1280, and so several energy levels can be set. Once the locking member 1400 engages in one of the catch positions or the operating sleeve 1330 is released, the support spring 1450, 1460 presses the support member 1410 back to the holding position according to FIG. 15, and so the locking member 1400 itself is held in the engaged locked position. In addition to the different energy levels, the locking member 1400 also comprises a disassembly position, in which the operating module 1300 can be detached from the drive module 1200.

Figure 17:
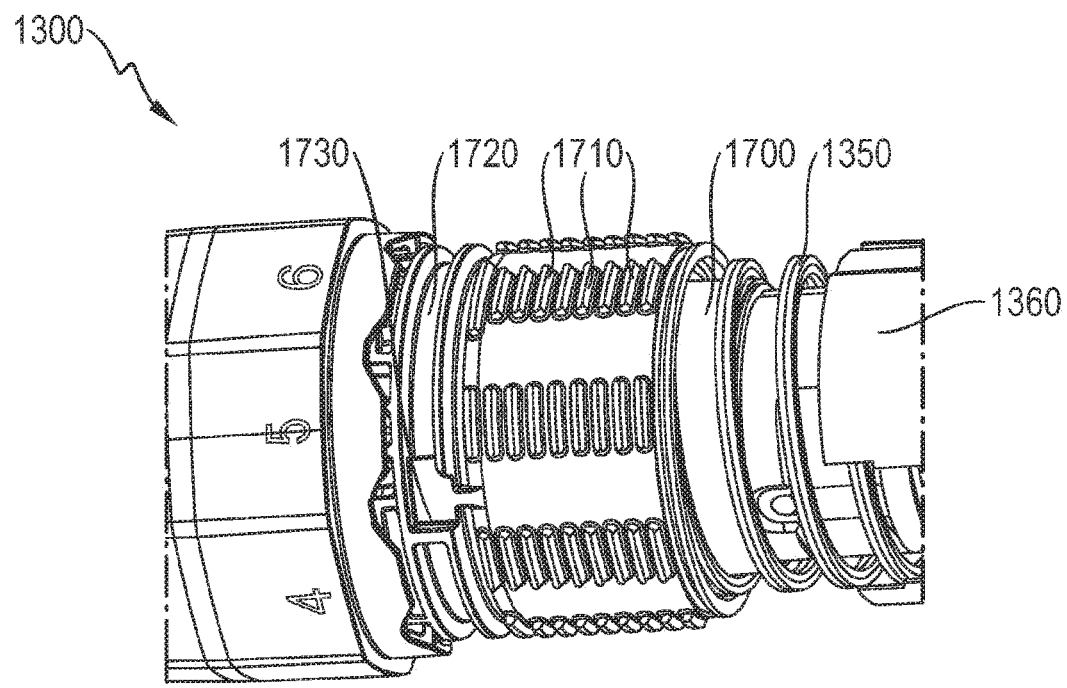
FIG. 17 shows a section of a module of a tool device.

FIG. 17 shows a section of the operating module 1300. The operating module 1300 comprises an insertion part 1700 with a plurality of second projections 1710. The insertion part 1700 has a guide 1720, in which the lock 1260 runs to an end stop 1730, when the insertion part 1700 is rotated relative to the drive module 1200, said end stop 1730 corresponding to the disassembly position of the locking member 1400, in which the operating module 1300 can be detached from the drive module 1200.

Figure 18:
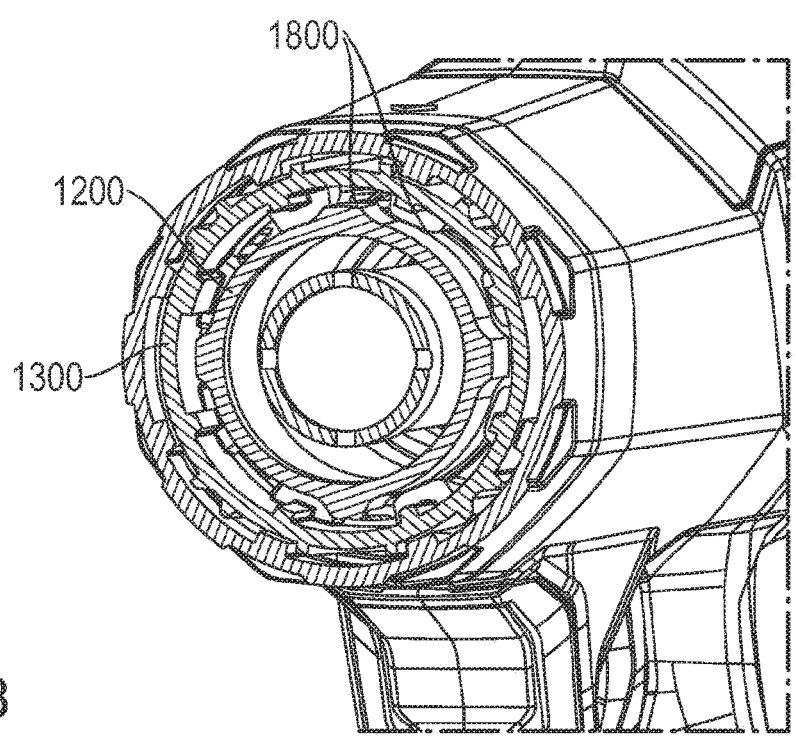
FIG. 18 shows a section of a module of a tool device.

FIG. 18 shows a cross-sectional view of a section of the drive module 1200. A pressed-on guide 1800 between the operating module 1300 and the drive module 1200 prevents a pressing-on and release of the tool device in the disassembly position and allows the pressing-on and release of the tool device in each of the operating positions (energy levels).

Figure 19:
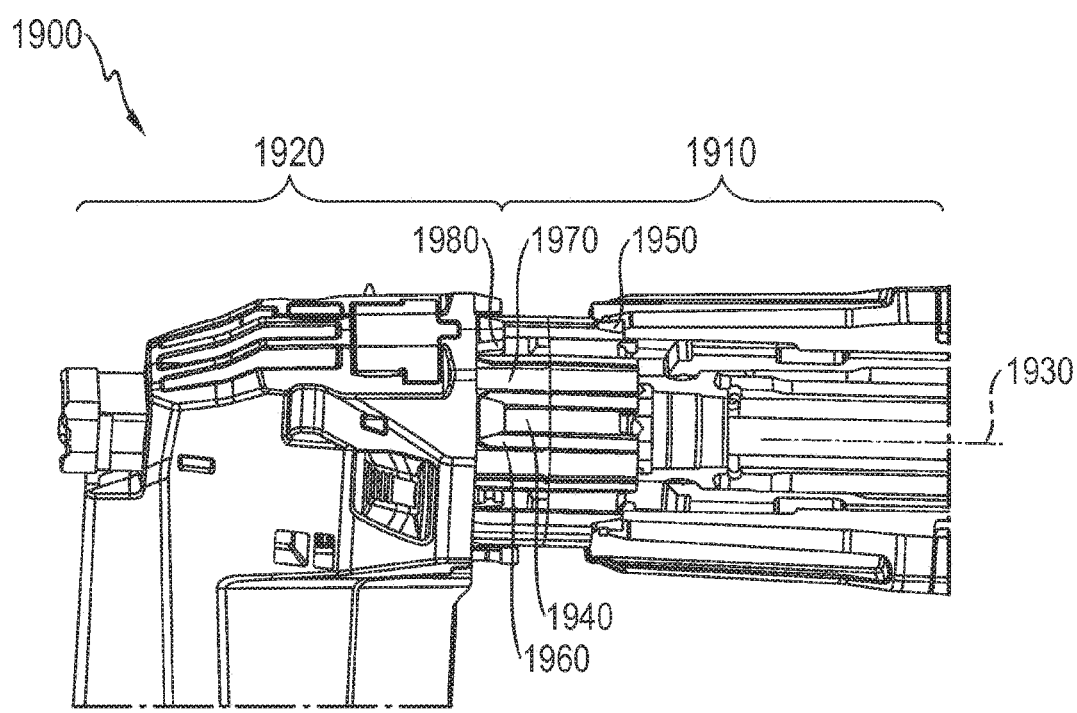
FIG. 19 shows a section of a tool device in a first position.
Figure 20:
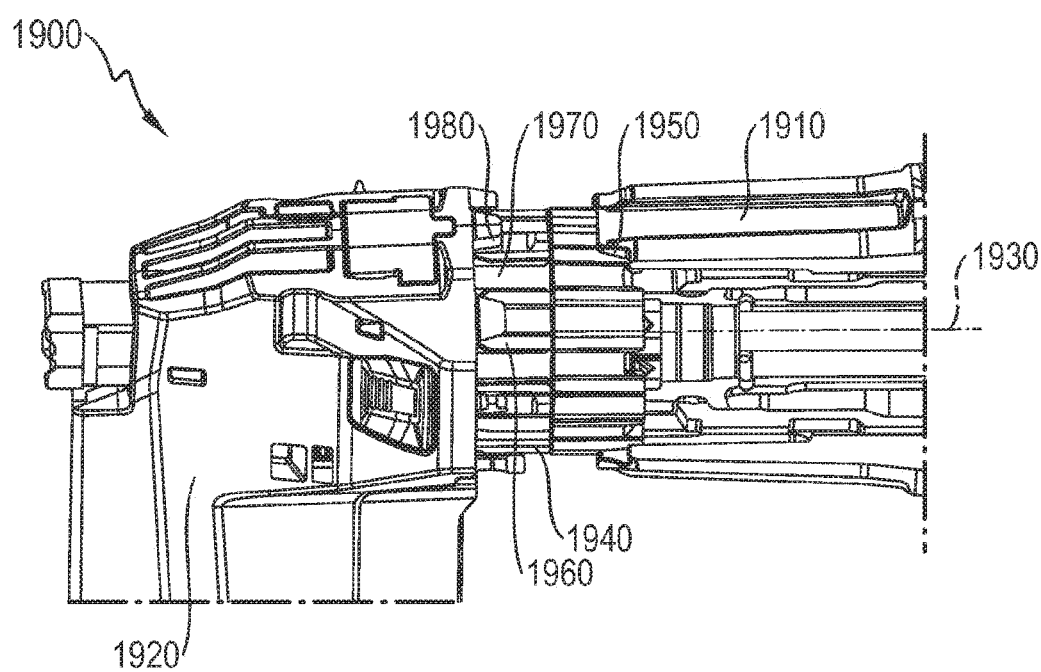
FIG. 20 shows a section of a tool device in a second position.

FIGS. 19 and 20 show a tool device 1900 having a drive module 1910 and a magazine module 1920 which can be detached from the drive module 1900. The magazine module 1920 comprises an insertion part (not depicted). The drive module 1910 comprises a receptacle (not depicted) which in an initial position according to FIG. 20 prevents an activation of the tool device, and in a pressed-on position according to FIG. 19 allows an activation of the tool device. The pressing of the magazine module 1920 onto the drive module 1900 transfers the receptacle in the direction of an insertion axis 1930 to the pressed-on position.

The drive module 1910 comprises a pressed-on locking element 1940, which is jointly moved with the receptacle along the insertion axis 1930, and a pressed-on blocking element 1950, wherein the pressed-on locking element 1940 is rotatable relative to the receptacle about the insertion axis 1930 between a normal position and a disassembly position. The pressed-on locking element 1940 has a pressed-on locking contour 1960, the movement of which is blocked by the pressed-on blocking element 1950 along the insertion axis 1930, when the pressed-on locking element 1940 is in the disassembly position. The pressed-on blocking element 1950 thus allows a transfer of the receptacle to the pressed-on position only when the pressed-on locking element 1940 is in the normal position. However, in the disassembly position of the pressed-on locking element 1940, the pressed-on blocking element 1950 blocks a transfer of the receptacle to the pressed-on position.

In order to ensure that the pressed-on locking element 1940 rotates jointly with the magazine module 1920, the pressed-on locking element 1940 has a drive contour 1970, and the magazine module 1920 has a driver 1980 which engages in the drive contour 1970, when the insertion part is inserted in the receptacle.

A rotation of the insertion part from the locked position to the enabled position effects a joint rotation of the pressed-on locking element 1940 from the normal position to the disassembly position. A rotation of the insertion part from the enabled position to the locked position also effects a joint rotation of the pressed-on locking element 1940 from the disassembly position to the normal position. The pressed-on locking element 1940 is designed as a sleeve arranged about the insertion axis 1930.

The invention was described using several embodiments of a driving-in device for fastening elements. It is understood that any and all features of the individual embodiments can be realized in a single device in any combination, provided that they do not contradict one another. It must also be noted that the invention is also suitable for other applications, particularly for screwing devices or hammer drills, and the like.

The invention claimed is:

1. A tool device, comprising a first module and a second module that can be detached from the first module, said first module having a receptacle and said second module having an insertion part that can be inserted in the receptacle along an insertion axis which defines an insertion direction, wherein the insertion part can be rotated in the receptacle about the insertion axis in one rotational direction between a locked position and an enabled position, wherein the receptacle has a first projection and the insertion part has a second projection, wherein, in the locked position, the second projection engages behind the first projection in the insertion direction of the insertion axis, wherein, in the enabled position, the first projection enables the second projection to pass in the direction of the insertion axis, wherein the tool device has a lock with a locking position and an unlocking position, and wherein, in the locking position, the lock prevents a detachment of the second module from the first module, and in the unlocking position allows the detachment of the second module from the first module, wherein the lock has a bolt arranged on one of the first and second modules and a bolt slot arranged on the other of the first and second modules, and wherein, in the locking position, the bolt engages in the bolt slot, and in the unlocking position, said bolt is arranged outside of the bolt slot, wherein the bolt moves, relative to the insertion axis, radially outwardly into the bolt slot during transition from the unlocking position to the locking position.

2. The tool device according to claim 1, wherein the other one of the first and second modules comprises the bolt slot.

3. The tool device according to claim 1, wherein the bolt moves, relative to the insertion axis, radially inwardly into the bolt slot during the transition from the unlocking position to the locking position.

4. The tool device according to claim 1, wherein the lock has an actuation element which is connected to the bolt.

5. The tool device according to claim 1, wherein the lock has a bolt spring, which loads the bolt and the bolt slot toward one another.

6. The tool device according to claim 1, wherein, in the locking position, the lock blocks a shifting of the insertion part relative to the receptacle along the insertion axis, and in the unlocking position, the lock allows the shifting of the insertion part relative to the receptacle along the insertion axis.

7. The tool device according to claim 1, wherein the lock has a plurality of bolt slots arranged on the other one of the first and second modules.

8. The tool device according to claim 1, wherein the insertion part is rotatable in the receptacle between several locked positions and several enabled positions about the insertion axis.

9. The tool device according to claim 1, further comprising a catch having a catch element and a catch seat, wherein, in the locking position, the catch element engages in the catch seat.

10. A tool device, comprising a first module and a second module that can be detached from the first module, said first module having a receptacle and said second module having an insertion part that can be inserted in the receptacle along an insertion axis which defines an insertion direction, wherein the insertion part can be rotated in the receptacle about the insertion axis in one rotational direction between a locked position and an enabled position, wherein the receptacle has a first projection and the insertion part has a second projection, wherein, in the locked position, the second projection engages behind the first projection in the insertion direction of the insertion axis, wherein, in the enabled position, the first projection enables the second projection to pass in the direction of the insertion axis, wherein the tool device has a lock with a locking position and an unlocking position, and wherein, in the locking position, the lock prevents a detachment of the second module from the first module, and in the unlocking position allows the detachment of the second module from the first module, further comprising a safety device having a secured position and an unlocked position, wherein, in the secured position, the safety device prevents an activation of the tool device, and in the unlocked position, the safety device allows said activation; and, an unlocking interlock which, in an enabled position, blocks a transition of the safety device from the secured position to the unlocked position, and in the locked position allows the transition of the safety device from the secured position to the unlocked position, wherein the unlocking interlock has a first blocking element arranged on the first module and a second blocking element arranged on the second module, and wherein, in the enabled position, the first blocking element and the second blocking element block one another, and in the locked position, the first blocking element and the second blocking element are enabled to pass one another.

11. The tool device according to claim 1, wherein, in the locking position, the lock blocks a rotation of the insertion part in the receptacle about the insertion axis, and in the unlocking position, the lock allows the rotation of the insertion part in the receptacle about the insertion axis.

12. The tool device according to claim 1, wherein, during the transition from the unlocking position to the locking position, the bolt moves along the insertion axis into the bolt slot.

13. The tool device according to claim 2, wherein the other one of the first and second modules has a connecting link which, relative to the other of the first and second modules, is rotatably arranged about the insertion axis and comprises the bolt slot.

14. The tool device of claim 4, wherein the activation element is rigidly connected to the bolt.

15. The tool device according to claim 1, wherein the lock has an actuation element which is connected to the bolt.

16. The tool device according to claim 1, wherein, in the locking position, the lock blocks a shifting of the insertion part relative to the receptacle along the insertion axis, and in the unlocking position, the lock allows the shifting of the insertion part relative to the receptacle along the insertion axis.

* * * * *